United States Patent Office 2,939,781
Patented June 7, 1960

2,939,781

PELLETING OF NITRAPHOSPHATE FERTILIZER

George R. Gilliam, Prince George County, Va., assignor to Allied Chemical Corporation, a corporation of New York No Drawing. Filed June 30, 1955, Ser. No. 519,270

1 Claim. (Cl. 71—64)

This invention relates to an improved method of producing a complete fertilizer of high plant-food content; more particularly, it relates to a method of producing a fertilizer of this type in pellet form.

Complete fertilizers such as the nitraphosphate have been produced for some time in a dry and granular form. However, the methods of producing the granular material have depended upon a recycling of the dry material. In accordance with this procedure, nitraphosphate slurry which is obtained after acidulating the phosphate rock and treating with ammonia is blended with recycled previously dried material. In accordance with this prior art processing technique, the recycled material generally consists of fines and oversize removed from the dry material by screening the material leaving the driers and coolers. When using this method it is necessary, as a preliminary, to crush the oversize during the recycling step in order for it to be effective for blending and granulating the slurry. These procedures of the prior art are quite cumbersome; they involve supplementary handling operations and the expenditure of costly power in blending and grinding. Furthermore, the amount of recycled material sometimes reaches 3 to 12 times that of the ultimate product of the plant. It is, therefore, quite readily apparent that these supplementary operations in and of themselves add considerably to the cost of the product. These operations, are however, even further complicated by the fact that in the grinding of the coarse grains, which are generally incompletely dried, the grinding equipment frequently becomes clogged and thus causes interruptions in the operations. This necessarily cuts down on the yield of product per day and further increases the cost of operation of the plant.

It is an object of this invention to produce a complete fertilizer of the nitraphosphate type in a more facile, economical, and efficient manner than has been possible with the prior art processes.

It is a further object of this invention to produce a nitraphosphate fertilizer in a desirable granular form by a process which will not require the recycling of any previously produced product.

It is a still further object of this invention to provide a method of producing a nitraphosphate fertilizer in a substantially dry, pelleted form.

These objects and other advantages incidental thereto can be attained by the evaporating of the nitraphosphate slurry under dynamic conditions to form a slurry having a very low water content and subsequently dispersing the concentrated slurry into droplets which are caused to solidify into pellets.

In accordance with the process of this invention, phosphate rock is acidulated with mixtures of nitric acid and sulfuric acid, phosphoric acid or both acids. The particular acid mixture used is selected to give a ratio of total mols of $PO_4$ and $SO_4$ to CaO in the final product of 1.0 or greater depending upon the product desired. During acidulation, from about 7 to 20 equivalents of acid are used per mol of $P_2O_5$ in the rock with the nitric acid considered monobasic and the sulfuric and phosphoric considered dibasic. The acidulation is normally carried out in the presence of water in an amount from about 15% to about 40% by weight of the total mixture. In the ammoniation step from 2 to 4 mols of ammonia are added per mol of $P_2O_5$ from the phosphate rock plus additional ammonia to neutralize the acid used in excess of that needed for solubilizing the rock. Some water may be evaporated by the heat of reaction of ammonia and acid. Water soluble fertilizer compounds such as potassium nitrate, sulfate or chloride, ammonium sulfate, urea, and sodium nitrate may be added to the mix during acidulation or ammoniation to produce the required nitrogen and potassium values in the product. Triple superphosphate may be added to adjust the $P_2O_5$ within the desired range. It is important, however, from the point of view of forming a pelletized product that the composition of the final ammoniated slurry, on dry basis, is at least 30% plant food, and that 38–55% of the total plant food is nitrogen, 12–42% is $K_2O$ and the residue is primarily $P_2O_5$. The water in the final ammoniated slurry, based on total weight of the slurry including all added salts, is maintained at from 14–40% water by weight, preferably from 15–25% water, by addition of water if required. The temperature of the completely ammoniated slurry after addition of all salts is normally about 75–125° C.

Since nitraphosphate slurries are difficult to dry in conventional rotary kiln driers, in view of the fact that the drier feed has a tendency to stick to the drier walls, it is preferable when operating in accordance with this invention to avoid their use. Therefore, slurries prepared as above described are preferably concentrated under dynamic conditions utilizing agitated tanks, falling film evaporators, Turba-film evaporators, or other appropriate equipment adapted to get the water content below 6% and preferably to less than 4% water by weight. The slurries to be pelleted should be heated in the evaporator to a temperature of about 120° C. to about 180° C., preferably 130–170° C., to obtain a mixture containing at least 45%, preferably at least 55%, liquid (water plus dissolved solids) at the temperature of the mix. These slurries are then dispersed into droplets which are allowed to fall a sufficient distance to allow them to form spherical pellets and harden enough so that they will not stick or splatter on landing. The height of free fall required increases with increased moisture, temperature, and total plant food content of the slurry to be pelleted, and decreases with increased volume of air used for cooling the pellets during the fall. In general, the free fall required is less than 100 feet when operating with slurries within the preferred limits of temperature and moisture and using only the air flow produced by natural convection in the tower. There are numerous procedures which may be used for forming the droplets. The slurry may, for example, be slung from the surface of a rotating drum or disk or it may be forced through a nozzle or orifice designed to form the slurry into droplets. Any type of equipment or device which will disperse the slurry into droplets of fairly uniform size can be used for this purpose. It is preferred that the device be such that the droplets formed are of a size which will permit the material to solidify into spherical pellets at least 95% of which will have diameters of from 0.094" to 0.016" and the bulk of which will have diameters of from 0.08" to 0.03".

Generally, the pellets formed as described above may be stored and shipped as formed. However, if the product contains more than about 1.5% water it may be desirable to further dry it in conventional equipment such as a rotary kiln drier. The product may also be cooled and screened to more closely regulate its size, or coated with a coating agent such as clay or dolomite to further improve its storage properties. If screening is employed, the small percent of product that would be returned need not be crushed and dry-blended as in the recycle system of the prior art, but can be returned, as is, directly to the ammoniators or the feed tank of the pelleting equipment. If screening is not employed, recycle is completely eliminated.

Examples of some of the pelleted fertilizers that have been made by the procedure described above are given in the table below:

| Example No | 1 | 2 | 3 | 4 |
|---|---|---|---|---|
| Grade | 20-10-10 | 18-9-9 | 14-14-4 | 18-9-18 |
| Formulation, lb. material per ton product: | | | | |
| Phosphate rock | 360 | 462 | 694 | 286 |
| Nitric acid (100% basis) | 756 | 837 | 608 | 531 |
| Sulfuric acid (100% basis) | 33.3 | 140.6 | 273 | |
| Phosphoric acid (100% basis) | 120.4 | 43.3 | | 125 |
| Potassium nitrate | 426 | | | 760 |
| Sodium nitrate | 70 | | | 124 |
| Ammonia | 207 | 226 | 181.4 | 147 |
| Potassium chloride | 14.9 | 308 | 140.6 | 27 |
| Triple superphosphate | | | 82.5 | |
| Pebbling Conditions: | | | | |
| Percent water in slurry | 1.8 | 2.5 | 6.0 | 2.9 |
| Temperature of slurry, °C | 148 | 170 | 130 | 162 |
| Percent water in product | 1.4 | 1.4 | 4.6 | 2.2 |
| Particle size range, Tyler Screens (Meshes per Lineal Inch): | | | | |
| Larger than 8 mesh, percent of total | 0.9 | 0.4 | 2.2 | 2.2 |
| Through 8 onto 10 mesh, percent of total | 11.1 | 1.5 | 1.6 | 4.4 |
| Through 10 onto 20 mesh, percent of total | 80.5 | 89.1 | 85.6 | 87.9 |
| Through 20 onto 28 mesh, percent of total | 7.4 | 8.5 | 10.5 | 5.4 |
| Through 28 onto 35 mesh, percent of total | 0.1 | 0.5 | 0.1 | 0.1 |

As further illustration of the proposed procedure a more detailed description of the pelleting of the 20-10-10 fertilizer, listed above as Example 1 follows: 70 lbs. of phosphate rock, containing 0.168 mol of $P_2O_5$ and 0.625 mol of CaO, were reacted with 39.0 lbs. of 60% phosphoric acid, 6.9 lbs. of 94% sulfuric acid and 231.7 lbs. of 63.4% nitric acid for about 10 minutes. During the reaction 82.9 lbs. of potassium nitrate, 13.6 lbs. of sodium nitrate and 878 lbs. of water were added. To the resultant mix 40.2 lbs. of anhydrous ammonia were added over a period of about 70 minutes. 2.9 lbs. of potassium chloride were added at the end of ammoniation. During ammoniation some water was lost by evaporation and the ammoniated slurry was evaporated in a film evaporator to a water content of 1.8% and a temperature of 148° C. The slurry was then run onto a rotating drum 3 inches wide and having a diameter of 24 inches from which it was slung in the form of fine drops into the top of a tower 80 feet high. No forced air flow was used in the tower during this run, air flow being limited to natural convection currents. The product collected at the bottom of the tower consisted of spherical particles of homogeneous fertilizer containing 1.4% water with 99% of the material being in the size range of 8-28 Tyler screen size. Because of its uniformity and spherical shape it is superior in storage and spreading properties to granular or conventional mixed goods of equal grade. In view of the elimination of the recycling steps of the prior art, and the need for grinding partially dried product, the process is, of course, much more facile, economic and efficient than that of the prior art.

While the above description discloses preferred and practiced embodiments of the pelleted nitraphosphate fertilizer and the improved method of its manufacture it will be understood that the specific details described are by way of illustration and are not to be construed as limiting the scope of the invention.

I claim:

A continuous process for preparing a nitraphosphate fertilizer consisting of spherical particles containing at least 30% plant food of which 38-55% is N, 12-42% is $K_2O$ and the residue is $P_2O_5$, and 95% of said particles having a size range of 8-35 mesh Tyler screen size, which process comprises treating phosphate rock with a mixed acid consisting of nitric acid and acid selected from the group consisting of sulfuric, phosphoric and mixtures thereof in the proportions of from 7 to 20 equivalents of mixed acid per mol of $P_2O_5$ in the rock, said mixed acid selected to give a ratio of about 1 mol of $PO_4$ and $SO_4$ to 1 mol of CaO in the rock, the acidulation of the rock being carried out in the presence of water in an amount from about 15% to about 40% by weight of the total mixture, ammoniating said acidulated material employing from 2 to 4 mols of ammonia per mol of $P_2O_5$ from the phosphate rock plus additional ammonia to neutralize the acid used in excess of that needed for solubilizing the rock, incorporating potassium chloride in the ammoniated material in amount required to furnish 12-42 parts of $K_2O$ for each 38-55 parts of N in the ammoniated material and maintaining sufficient water so that the final ammoniated slurry, including added potassium chloride, contains 14-40% water by weight, by addition of water if required, evaporating the slurry so formed at 120-180° C. to form a slurry having a water content of less than 6% water and a liquid phase of at least 45% at evaporation temperature, said evaporation being conducted in an evaporator where it is subjected to vigorous agitation, maintaining the temperature at 120-180° C., dispersing the concentrated slurry into a gaseous atmosphere in the form of droplets, cooling said droplets in said atmosphere to form pellets, and collecting said pellets.

References Cited in the file of this patent

UNITED STATES PATENTS

| | | |
|---|---|---|
| 1,773,257 | Buse | Aug. 19, 1930 |
| 1,876,501 | Johnson | Sept. 6, 1932 |
| 2,061,534 | Balz et al. | Nov. 17, 1936 |
| 2,136,793 | Gabeler et al. | Nov. 15, 1938 |
| 2,297,300 | Hardesty et al. | Sept. 29, 1942 |
| 2,382,298 | Datin | Aug. 14, 1945 |
| 2,589,734 | Ruosch | Mar. 18, 1952 |
| 2,714,224 | Schaub | Aug. 2, 1955 |
| 2,804,383 | Pike | Aug. 27, 1957 |